United States Patent Office 2,843,580
Patented July 15, 1958

2,843,580
METALLIZED AZO DYES PREPARED BY COUPLING AMINO-PHENOLS TO DIPHENYLAMINES

James M. Straley and David J. Wallace, Kingsport, Tenn., assignors to Eastman Kodak Company, Rochester, N. Y., a corporation of New Jersey No Drawing. Application April 4, 1956
Serial No. 575,953

11 Claims. (Cl. 260—149)

This invention relates to certain metallized azo dyes and their application to the dyeing or coloration of various materials.

The dyes of this invention are metallized complexes of azo dyes having the structural formula:

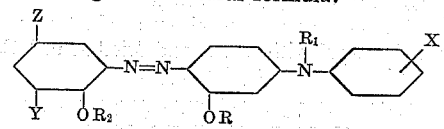

wherein R represents hydrogen, alkyl, for example, methyl, ethyl, propyl, butyl and the like, and hydroxyalkyl, for example, hydroxyethyl, hydroxypropyl, hydroxybutyl and the like; $R_1$ represents hydrogen, alkyl, for example, methyl, ethyl, propyl, and the like, hydroxyalkyl, for example, hydroxyethyl, hydroxypropyl, hydroxybutyl and cyanoalkyl, for example, cyanoethyl; $R_2$ represents hydrogen or alkyl, for example, methyl, ethyl, propyl, butyl and the like; X represents hydrogen, alkyl, for example, methyl, ethyl, propyl, butyl and the like, alkoxy, for example, methoxy, ethoxy, propoxy and the like, and halogen; and Y and Z each represents hydrogen, a halogen, nitro, alkyl, for example, methyl, ethyl, propyl, butyl, and the like, sulfonamido, for example, sulfonamide, and the like, and haloalkyl, for example trifluoro methyl, trichloro methyl, and the like.

The nonmetallized dyes that are employed in preparing the dyes of this invention which have the above structural formula are prepared by diazotizing an amine having the structural formula:

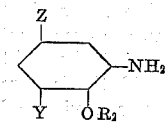

The resulting diazo compound is then reacted or coupled with a diphenylamine having the structural formula:

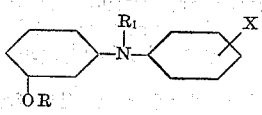

In the above formulas for the amino compound to be diazotized and the diphenylamine, R, $R_1$, $R_2$, X, Y and Z are as defined in the formulas set forth above for the nonmetallized dyes. One method of carrying out the diazotization reaction involves dissolving the amino compound in an aqueous hydrochloric solution and then adding sodium nitrite. The details of the diazotization reaction are set forth in the specific examples and the procedures described in those examples represent methods by which the diazotization reaction can be carried out.

The diphenylamines that are employed in preparing the dyes of this invention are termed couplers. Suitable procedures for preparing the various diphenylamines of this invention are set forth in the specific examples. Any of these procedures can be used to form the various couplers or diphenylamines that are used in preparing the metallized dyes of this invention.

The nonmetallized dyes, after their preparation, are reacted with a metal salt, such as suitable salts of nickel, cobalt, copper, chromium, manganese, iron or vanadium. The nonmetallized azo compounds can be metallized either on or off the materials they color. Metallization can be carried out, for example, by treating the nonmetallized azo compound with a solution or dispersion of the metallizing agent. Although the metal complex is often formed at room temperature, we prefer to accelerate the process by heating, usually with steam, for a short period of time. The metallization is effected by procedures well known to those skilled in the art to which this invention is directed.

Illustrative of the metallizing agents that can be employed are the halides, the sulfates, the acetates, the cyanides and the thiocyanates of nickel, cobalt, chromium, manganese, iron and vanadium as well as various copper compounds. Thus, nickel chloride, nickel bromide, nickel sulfate, nickel acetate, nickel cyanide, nickel formate, nickel thiocyanate [$Ni(SCN)_2$], cobaltous bromide, cobaltic chloride, cobaltous chloride, cobaltous acetate, cobaltous cyanide, cobalt thiocyanate [$Co(SCN)_2$], cupric chloride, cupric bromide, cupric acetate, cupric lactate, chromium trichloride, chromium tribromide, chomic sulfate, chromic acetate, chromium thiocyanate [$Cr(SCN)_3$], manganese chloride, manganous sulfate, manganese acetate, manganese thiocyanate [$Mn(SCN)_2$], ferric chloride, ferric fluoride, ferrous acetate, ferrous thiocyanate [$Fe(SCN)_2$], ferric thiocyanate [$Fe(SCN)_3$], and vanadium thiocyanate [$V(SCN)_2$] are illustrative of the metallizing agents that can be employed.

The nonmetallized monoazo compounds described herein are useful for the dyeing of cellulose alkyl carboxylic acid esters having 2 to 4 carbon atoms in the acid groups thereof, nylon, sulfone polyesters, polyethylene terephthalate and polyacrylonitrile. After application to these materials, usually in the form of textile materials, the dye is metallized thereon. The metallized azo compounds of our invention can be applied by ordinary dyeing or printing techniques to nitrogenous textile materials such as wool, silk, nylon and acrylonitrile polymers, for example. Coloration can also be effected by incorporating the nonmetallized or metallized azo compounds into the spinning dope, spinning the fiber as usual and converting the nonmetallized azo compounds to their metallized form. Also the metallizing agent can be incorporated in the spinning dope, the fiber spun as usual and then dyed with the nonmetallized monoazo compounds to form the metal complex on the fiber. The new metallized dyes of our invention are preferably formed by heating the nonmetallized azo dye with the metallizing agent in organic solvents such as, for example, cellulose acetate, cellulose acetate-propionate, acrylonitrile polymers, polyamides, ethylene glycol monomethyl ether and formamide.

As is well known, one of the disadvantages dyed cellulose acetate textile fabrics suffer in comparison with some of the dyed competing textile fabrics, such as cotton, wool and viscose, for example, is lack of fastness to washing. Many schemes have been proposed to remedy this situation but all suffer from some significant fault. By means of our invention dyed cellulose acetate textile materials having good to excellent fastness to washing, light and gas are obtainable. These results may be obtained by dyeing the cellulose acetate textile material with the nonmetallized azo compounds and then treating the dyed cellulose acetate textile material with suitable metal salts which cause the original dye to form metallic complexes which are resistant, for example, to the action of washing, light and gas. These results can also be obtained by incorporating the metallized azo dye into the cellulose acetate spinning dope and spinning the fiber as usual. Thus, by means of the present invention, the disadvantage noted above with respect to the wash fastness of dyed cellulose acetate textile materials is either entirely or largely overcome. Cellulose acetate has been particularly referred to because it is the most widely used cellulose alkyl carboxylic acid ester.

When the metal complex is formed on a cellulose alkyl carboxylic acid ester, such as cellulose acetate fiber, the use of a metal thiocyanate appears to be advantageous and is preferred. Nickel thiocyanate appears to be especially useful and particular claim is laid to its use. Next to nickel thiocyanate the use of cobalt thiocyanate is preferred.

Metallization will be described in detail with reference to nickel and cobalt inasmuch as the metallized dyes containing these materials in complex combination appear to be advantageous. However, it will be clearly understood that the nonmetallized azo compounds can be metallized with the other metals disclosed herein. The azo compounds disclosed herein have varying utility as dyes. The degree of utility varies, for example, depending upon the material being colored and the actual dye employed.

The following examples serve to illustrate our invention:

EXAMPLE 1.—PREPARATION OF THE COUPLERS

The couplers employed in the practice of this invention may be prepared by a variety of methods. In general, the diphenylamine is treated under pressure with slightly more than the calculated amount of ethylene oxide and the products separated by distillation or crystallization. It should be noted that, if both the 3-oxygen and the amine nitrogen bear only hydrogen, the nature and amounts of hydroxyalkylation will be greatly influenced by the character and position of other substituents present. These statements will become clearer when the preparation of these intermediates is studied.

Sixty-two grams of 3-hydroxydiphenylamine and 38 g. of ethylene oxide in 125 g. of ethanol are agitated in an autoclave at 200° C. for 12 hours. After cooling, the contents of the autoclave are fractionally distilled. After removal of the alcohol the following cuts are taken:

(1) B. 188–94°/0.5 mm.—27 g.
(2) B. 214–17° C./0.3 mm.—37 g.

On standing cut No. 2 solidified and upon recrystallization from benzene, melted at 74–5° C. By analysis, molecular weight and qualitative tests for phenol groups cut No. 2 is N-β-hydroxyethyl-3-β-hydroxyethoxydiphenylamine, and cut No. 1 is N-β-hydroxyethyl-3-hydroxydiphenylamine.

The above procedure when performed upon 3-hydroxy-2'-chlorodiphenylamine gives only one fraction, B. 173–6° C./0.08 mm., which is hydroxyethylated on the nitrogen only. This is likewise the case when the reaction is performed with 3-hydroxy-2'-methoxydiphenylamine, 3-hydroxy-2'-methyldiphenylamine, 3-hydroxy-4'-methyldiphenylamine, 3-hydroxy-3'-chlorodiphenylamine, boiling at 171–8° C./0.2 mm., 184–90° C./0.2 mm., 184–200° C./0.2 mm., 189–201° C./0.3 mm., and 188–196° C./0.4 mm. respectively. On the other hand, 3-methoxydiphenylamine, 3-hydroxy-3'-methyldiphenylamine, both give only one product, boiling at 164–6° C./0.4 mm., and 185–190° C./0.3 mm. respectively, which by analysis and tests for phenol groups are hydroxyethylated upon the nitrogen only. Further, 3-hydroxy-4'-methoxydiphenylamine gives only one fraction which after recrystallization from benzene melts at 94–6° C. From elementary analysis and tests for phenolic groups this product is N-β-hydroxyethyl-3-β-hydroxyethoxy-4'-methoxydiphenylamine.

An autoclave was charged with 20 g. 3-hydroxydiphenylamine, 1 g. copper acetate, 40 cc. of acrylic nitrile, 2 g. copper bronze, and 40 cc. of acetic acid and heated at 150° C. for 10 hours. The cooled product was filtered and poured into 600 cc. of water. The oily mass was washed by decantation and dried by distillation of benzene from the oil. Purification by distillation was not attempted because of the tendency of acrylonitrile adducts to reverse at high temperatures. Qualitative studies on the product indicate it to be N-β-cyanoethyl-3-hydroxydiphenylamine.

EXAMPLE 2.—PREPARATION OF NON-METALLIZED DYE

A solution of 7.2 g. of 2-amino-4-chlorophenol in 15 cc. of concentrated HCl and 50 cc. of water was cooled to 0° C. and a solution of 3.8 g. of sodium nitrite in 10 cc. of water was added below 50° C. with good stirring. The mixture was stirred two hours and run into a well-stirred solution of 11.9 g. of N-β-cyanoethyl-3-hydroxydiphenylamine in 75 cc. of mixed propionic-acetic acids (1:5) at 0–5° C. The coupling is held below 10° C. for 2 hours, the mineral acid neutralized with ammonium acetate and the mix then drowned in 1000 cc. of cold water. The slightly sticky yellow product was filtered off, washed neutral with water, and dried at 60° C. The yield was 14 g. of nonmetallized dyes.

EXAMPLE 3.—PREPARATION OF NON-METALLIZED DYE

A solution of 23.1 g. of 2-amino-4-nitrophenol in 150 cc. of water and 45 cc. of concentrated hydrochloric acid was diazotized at 0–5° by the careful addition of 10.8 g. of sodium nitrite in 30 cc. of water. The mix was stirred two hours below 5° C. and the excess nitrous acid destroyed with sulfamic acid. The diazo compound was then run into a stirred solution of 36.5 g. of N-β-hydroxyethyl-3-methoxydiphenylamine in 370 cc. of mixed propionic-acetic acids (1:5) at 5° C. After addition the coupling was stirred 3 hours at room temperature and drowned in 6000 cc. of water. The product was filtered off, washed neutral with water, rinsed with a little hexane, and dried at 50° C. in vacuo. This yield is 59.7 g. (97% of theory) of orange powder.

EXAMPLE 4

Fifty grams of the product of Example 3, 33 grams of nickel acetate crystals, 15 g. of sodium carbonate (anhydrous) and 2500 cc. of the monomethyl ether of ethylene glycol were refluxed 8 hours and poured into 36 liters of water. The suspension was heated to 85° C. with direct steam, filtered, and washed with water. The product, after drying at 110° C., is a red powder weighing 55.5 g., which represents a yield of 96%, based on a ratio of 1 mole of dye combined with one atom of nickel. This product when incorporated into an acetone solution of cellulose acetate and extruded in the usual fashion yields a beautiful red yarn of excellent fastness properties. The tinctorial strength of this pigment is exceptionally good.

The metal pigment when applied from an aqueous dispersion to nylon, wool, or polyacrylonitrile gives deep red attractive dyeings of good fastness to light.

EXAMPLE 5.—PREPARATION OF NON-METALLIZED DYE

A solution of 3.8 g. of sodium nitrite in 25 cc. of concentrated sulfuric acid was prepared at 70° C. and cooled to 0° C. Fifty cc. of mixed propionic-acetic acids (1:5) was added below 10° C. At 0° C. 9.95 g. of picramic acid, 2-amino-4,6-dinitrophenol was added, followed by another 50 cc. portion of mixed propionic-acetic acids (1:5). To this solution was added 11.5 g. of N-β-hydroxyethyl-3-hydroxydiphenylamine in 75 cc. of mixed propionic-acetic acids (1:5) at 5° C. The mineral acid was neutralized with ammonium acetate and the mix stirred one hour longer at room temperature. The mix was drowned in 1500 cc. of water, the product isolated by filtering, washing neutral with cold water. After drying in vacuo at 50° C. there was obtained 20 g. of nonmetallized dye.

EXAMPLE 6

A 3% dyeing of the product of Example 3 on cellulose acetate was padded with a 2–5% solution of nickel thiocyanate under such conditions that the pickup is 80–100% on the weight of the goods. After airdrying, the cloth was steamed at 0–5 p. s. i. for 10 minutes, scoured at 60–80° C. with soap and water, rinsed and dried. The fabric was a beautiful red, and withstood a standard wash test at 160° F. Furthermore, while the original orange fabric faded badly at 20 hours in the Fade-Ometer, the metallized dyeing showed no break at 60 Fade-Ometer hours. A 0.5% dyeing after metallization showed an almost imperceptible break at 40 hours, appreciable fading occurring only after 60 Fade-Ometer hours.

Similar results were obtained with cobalt thiocyanate, slightly duller and browner reds resulting.

Ferrous or ferric thiocyanates yielded brown to black shades, depending upon the depth of the original dyeing, chromium salts yielded dull reddish browns, and manganese salts yielded a brown color.

EXAMPLE 7

When a dyeing of the product of Example 2 was metallized as in Example 6, the result was a red with nickel and a brown with cobalt. Both were materially improved in fastness, particularly to light.

EXAMPLE 8

A dyeing of the product of Example 5 treated as in Example 6 gave red-violet to violet dyeings of excellent fastness properties.

EXAMPLE 9

To an acetone solution of cellulose acetate was added 1% (based on the weight of the acetate) by weight of cupric bromide. After spinning into yarn in the usual fashion the yarn was dyed with the product of Example 2 and the yarn then heated at 150° C. for 5 minutes.

The resultant red fibers exhibited excellent resistance to the action of light and laundering.

In Table I are listed other dyes prepared by following the above examples. The final colors listed were obtained by following the procedure of Example 6. The metals were incorporated by using the corresponding metal thiocyanates. The original and final colors are the colors of the nonmetallized and metallized dyes respectively.

Table I

| Ex. | Amines diazotized | Coupler used | Metal | Color Original | Color Final | On polyacrylonitrile and nylon |
|---|---|---|---|---|---|---|
| 10 | 2-aminophenol | N-β-hydroxyethyl-3-hydroxydiphenylamine | Nickel | Yellow | Orange | |
|    |                |                                          | Cobalt | do     | do     | |
| 11 | 2-amino-4-chlorophenol | do | Nickel | do | Red | |
|    |                        |    | Cobalt | do | Brown | |
| 12 | 2-amino-4-amidosulfophenol | do | Nickel | do | Orange | |
|    |                             |    | Cobalt | do | do | |
| 13 | 2-amino-4-nitrophenol | do | Nickel | Orange | Red | |
|    |                       |    | Cobalt | do     | do  | |
| 14 | do | N-β-cyanoethyl-3-hydroxydiphenylamine | Nickel | do | Pink | |
|    |    |                                        | Cobalt | do | do | |
| 15 | do | N-β-hydroxyethyl-3-β-hydroxyethoxydiphenylamine | Nickel | do | Scarlet | |
|    |    |                                                  | Cobalt | do | do | |
| 16 | do | N-β-hydroxyethyl-2'-chloro-3-hydroxydiphenylamine | Nickel | do | Brown | Orange. |
|    |    |                                                    | Cobalt | do | do | Do. |
| 17 | do | N-β-hydroxyethyl-2'-methoxy-3-hydroxydiphenylamine | Nickel | do | Red | |
|    |    |                                                     | Cobalt | do | do | |
| 18 | do | N-β-hydroxyethyl-3-β-hydroxyethoxy-4'-methoxydiphenylamine | Nickel | do | do | |
|    |    |                                                             | Cobalt | do | do | |
| 19 | do | N-β-hydroxyethyl-3-hydroxy-4'-methoxydiphenylamine | Nickel | do | do | |
|    |    |                                                     | Cobalt | do | do | |
| 20 | 2-amino-4,6-dinitrophenol | N-β-hydroxyethyl-3-β-hydroxyethoxydiphenylamine | Nickel | Brown | Red-violet | |
|    |                            |                                                  | Cobalt | do    | do         | |
| 21 | do | N-β-hydroxyethyl-3-methoxydiphenylamine | Nickel | do | Red | |
|    |    |                                          | Cobalt | do | do | |
| 22 | do | N-β-hydroxyethyl-2'-chloro-3-β-hydroxyethoxydiphenylamine | Nickel | do | Red-brown | Brown. |
|    |    |                                                            | Cobalt | do | do        | Do. |
| 23 | 2-amino-4-trifluoromethylphenetole | N-β-hydroxyethyl-3-hydroxydiphenylamine | Nickel | Yellow | Orange | |
|    |                                     |                                          | Cobalt | do     | do     | |
| 24 | do | N-β-hydroxyethyl-3-methoxy-3'-methyldiphenylamine | Nickel | do | do | |
|    |    |                                                    | Cobalt | do | do | |
| 25 | do | N-β-hydroxyethyl-3-methoxydiphenylamine | Nickel | Orange | do | Orange. |
|    |    |                                          | Cobalt | do     | Yellow-brown | Do. |
| 26 | do | N-methyl-3-methoxydiphenylamine | Nickel | do | Orange | Do. |
|    |    |                                   | Cobalt | do | Yellow-brown | Do. |

EXAMPLE 27

9.4 g. [0.05 m.] of 3-amino-4-hydroxybenzenesulfonamide were dissolved in 50 cc. of water and 15 cc. of concentrated HCl. After cooling to 0° C. the amine was diazotized by addition of 3.8 g. $NaNO_2$ in 10 cc. of water below 5° C. with good agitation. After a total of 2 hours' stirring below 5° C. the excess $HNO_2$ was destroyed with sulfamic acid. The diazonium solution so obtained was stirred into a solution of 12.2 g. of N-β-hydroxyethyl-3-methoxydiphenylamine in 150 cc. of mixed propionic-acetic acids (1:5) below 10° C. After addition the mix was allowed to stir 1 hour without further cooling, and the mineral acid neutralized to Congo with ammonium acetate. The coupling was then drowned in 1000 cc. of water and the product isolated by filtration, washing and drying. The yield was 16.8 g. of nonmetallized dye.

When a 3% dyeing of this product on cellulose acetate was treated as in Example 6, a red fabric was produced which withstood a standard wash test with soap and soda ash at 160° F. and had excellent resistance to the action of light.

When cobalt thiocyanate was used, the final fabrics were somewhat yellower but exhibited the same excellent resistance to light and laundering.

EXAMPLE 28

The procedure of Example 27 was repeated with the following observations:

Coupler 17.5 g. of N-β-hydroxyethyl-3-β-hydroxyethoxy-3'-methyldiphenylamine

Yield=26.5 g.

Unmetallized dyeing on cellulose acetate—reddish orange
Chelated with Ni(SCN)$_2$—blue
Chelated with Co(SCN)$_2$—blue
Fastness of chelated dyeings—excellent

EXAMPLE 29

The procedure of Example 27 was repeated with the following observations:

Coupler 12.7 g. of N-β-cyanoethyl-3-methoxydiphenylamine
Yield=19.6 g.
Unmetallized dyeing on cellulose acetate—orange
Chelated with Ni(SCN)$_2$—red
Chelated with Co(SCN)$_2$—red
Fastness of chelated dyeings—excellent

EXAMPLE 30

The procedure of Example 27 was repeated with the following observations:

Coupler 16 g. N-β-hydroxyethyl-3-β-hydroxyethoxydiphenylamine
Yield=23.8 g.
Unmetallized dyeing on cellulose acetate—orange
Chelated with Ni(SCN)$_2$—red
Chelated with Co(SCN)$_2$—red
Excellent light and wash fastness

EXAMPLE 31

The procedure of Example 27 was repeated with the following observations:

Coupler 10.6 g. 3-methoxy-3'-methyldiphenylamine
Yield=18.9 g.
Unmetallized dyeing on cellulose acetate—orange
Chelated with Ni(SCN)$_2$—red
Chelated with Co(SCN)$_2$—brown
Light and wash fastness—excellent

EXAMPLE 32

A solution of 15.4 g. (0.1 m.) of 2-amino-4-nitrophenol in 100 cc. of water and 30 cc. of concentrated HCl was diazotized by careful addition of 7.2 g. of NaNO$_2$ in 16 cc. of water. After 1.5 hours' stirring below 5° C. the excess HNO$_2$ was destroyed by the addition of urea. The diazonium solution thus prepared was run into a solution of 35 g. of N-β-hydroxyethyl-3β-hydroxyethoxy-3'-methyldiphenylamine in 300 cc. of mixed propionic-acetic acids (1:5). After addition the mix was stirred 2 hours without further cooling and the mineral acid neutralized to Congo by means of ammonium acetate. The coupling was drowned in 4000 cc. of water, filtered, and the solid washed with water and dried in air. The yield was 44.5 g. of material which dyed cellulose acetate in deep orange shade.

A 3% dyeing, metallized with Ni(SCN)$_2$, gave red fabrics of good resistance to light and washing.

The use of cobalt thiocyanate gave red-brown fabrics of excellent light and wash fastness.

EXAMPLE 33

The procedure of Example 32 was repeated with the following observations:

Coupler 26 g. of N-β-cyanoethyl-3-methoxydiphenylamine
Yield=37 g.
Unmetallized dyeing on cellulose acetate—orange
Chelated with Ni(SCN)$_2$—red
Chelated with Co(SCN)$_2$—red
Light and wash fastness—good

EXAMPLE 34

The procedure of Example 32 was repeated with the following observations:

Coupler 33 g. of N-β-hydroxyethyl-3-β-hydroxyethoxydiphenylamine
Yield=41 g.
Unmetallized dyeing on cellulose acetate—orange
Chelated with Ni(SCN)$_2$—red
Chelated with Co(SCN)$_2$—red
Light and wash fastness—good

EXAMPLE 35

The procedure of Example 33 was repeated with the following observations:

Coupler 22 g. of 3-methoxy-3'-methyldiphenylamine
Yield=33 g.
Unmetallized dyeing on cellulose acetate—orange
Chelated with Ni(SCN)$_2$—red
Chelated with Co(SCN)$_2$—red-brown
Light and wash fastness—good

EXAMPLE 36

The procedure of Example 4 was repeated with the nickel acetate replaced by 30 g. of cobalt(ous) chloride crystals. A product was obtained which when spun into cellulose acetate yarn yielded reddish brown fibers of good resistance to the action of light and washing.

EXAMPLE 37

The dye of Example 27 was prepared as described, except that the moist, washed filter cake before drying was suspended in 500 cc. of water and brought to 60–70° C. With good stirring, 95 cc. of a 20% solution of nickel thiocyanate was added at 60–70° C. in about 30 minutes. The temperature was brought to 90–95° C., meanwhile keeping the reaction slightly alkaline by the addition of ammonium hydroxide, a soda ash solution. When the reaction was complete (alkalinity maintains itself), the hot solution was filtered, obtaining a red solid. This product when spun into acetate yarn yielded red fibers of good resistance to light and washing.

EXAMPLE 38

The thiocyanate in Example 37 was replaced by an equivalent amount of cobalt thiocyanate. The yarn produced was a red-orange of good light and wash fastness characteristics.

EXAMPLE 39

1 g. of the product of Example 37 was refluxed in 16 cc. of acetone. 2.2 cc. of 28% NH$_4$OH was added, followed by 0.8 g. of nickel acetate crystals in 16 cc. of hot acetone. The mix was stirred and refluxed 3 hours obtaining a clear red solution, and drowned in 400 cc. of water. The pigment was isolated by filtering, washing, and drying at 60° C. The product incorporated into acetate yarn yielded red fibers of excellent resistance to light and laundering.

EXAMPLE 40

In Example 39, the nickel salt was replaced by 0.8 g. cobalt acetate. The resulting acetate yarn was a red yarn having excellent resistance to light and laundering.

In Table II are listed additional metallized dyes prepared in the manner described above. The colors of the non-metallized and metallized dyes are shown.

Table II

| Example | Diazotized amine | Coupler used | Metal | Color Original | Color Final |
|---|---|---|---|---|---|
| 41 | 3-amino-4-hydroxybenzenesulfonamide | N-Methyl-3-methoxydiphenylamine | Nickel / Cobalt | Orange / do | Red. / Do. |
| 42 | do | 3-β-hydroxyethoxy-N-β-hydroxyethyl-3'-chlorodiphenylamine | Nickel / Cobalt | do / do | Do. / Brown. |
| 43 | do | 3-methoxy-2'-methyldiphenylamine | Nickel / Cobalt | do / do | Red. / Do. |
| 44 | do | 3-β-hydroxyethoxy-N-β-hydroxyethyl-4'-methoxydiphenylamine | Nickel / Cobalt | do / do | Do. / Do. |

In Table III are listed additional metallized dyes within the scope of this invention. In this table the original and final colors are the colors of the non-metallized and metallized dyes respectively.

cyanoalkyl; $R_2$ is selected from the group consisting of hydrogen and alkyl; X is selected from the group consisting of hydrogen, alkyl, alkoxy and chlorine; and Y and Z are selected from the group consisting of hydrogen,

Table III

| Ex. | Diazotized amine | Coupler | Metal | Color Original | Color Final | On polyacrylonitrile and nylon |
|---|---|---|---|---|---|---|
| 45 | 2-amino-4-t-butyl-6-nitrophenol | 3-hydroxy-3'-methyldiphenylamine | Nickel / Cobalt | Orange / do | Violet / do | Orange. |
| 46 | do | 3-hydroxy-N-β-hydroxyethyl-4'-methoxydiphenylamine | Nickel / Cobalt | do / do | Red / do | Do. |
| 47 | 2-amino-4-nitrophenol | 3-methoxy-N-methyldiphenylamine | Nickel / Cobalt | do / do | do / do | |
| 48 | do | 3-methoxy-N-β-cyanoethyldiphenylamine | Nickel / Cobalt | do / do | do / do | |
| 49 | do | 3-methoxy-N-β-hydroxyethyl-3'-methyldiphenylamine | Nickel / Cobalt | do / do | do / do | Orange. |
| 50 | do | 3-β-hydroxyethoxy-N-β-hydroxyethyl-3'-chlorodiphenylamine | Nickel / Cobalt | do / do | do / do | Do. |
| 51 | 2-amino-4,6-dinitroaminophenol | 3-β-hydroxyethoxy-N-β-hydroxyethyl-4'-methoxydiphenylamine | Nickel / Cobalt | Violet / do | Violet / do | |
| 52 | do | 3-β-hydroxyethoxy-N-β-hydroxyethyl-2'-chlorodiphenylamine | Nickel / Cobalt | Orange / do | Red-brown / do | Brown. |
| 53 | do | 3-methoxy-2'-methyldiphenylamine | Nickel / Cobalt | Violet / do | Violet / do | Violet. |
| 54 | do | 3-methoxy-N-methyldiphenylamine | Nickel / Cobalt | Tan / do | Red / do | Do. |
| 55 | do | 3-methoxy-N-β-cyanoethyldiphenylamine | Nickel / Cobalt | do / do | do / do | |
| 56 | do | 3-hydroxy-N-β-hydroxyethyl-2'-methoxydiphenylamine | Nickel / Cobalt | Red / do | Violet / do | Red. |
| 57 | do | 3-β-hydroxyethoxy-N-β-hydroxyethyl-3'-methyldiphenylamine | Nickel / Cobalt | do / do | Red / do | Do. |
| 58 | do | 3-β-hydroxyethoxy-N-β-hydroxyethyl-3'-chlorodiphenylamine | Nickel / Cobalt | do / do | do / do | Do. / Do. |
| 59 | 2-amino-4-diethylamidosulfoanisole | 3-hydroxy-N-β-hydroxyethyldiphenylamine | Nickel / Cobalt | Orange / do | Orange / do | Orange. |
| 60 | 2-amino-4-nitrophenol | 3-hydroxy-N-β-hydroxyethyl-2'-methyldiphenylamine | Nickel / Cobalt | do / do | do / do | Do. |
| 61 | 2-amino-4-amidosulfophenol | 3-methoxydiphenylamine | Nickel / Cobalt | do / do | do / do | Do. / Do. |
| 62 | 2-amino-4-chlorophenol | do | Nickel / Cobalt | Tan / do | Brown / Red | Do. / Do. |
| 63 | 2-amino-4,6-dinitrophenol | 3-methoxy-3'-methyldiphenylamine | Nickel / Cobalt | Red / do | do / do | Red. / Do. |

We claim:

1. As a composition of matter, a complex metal compound which contains a metal selected from the group consisting of chromium, cobalt, copper, iron, manganese, nickel and vanadium in complex combination with a monoazo compound having the following structural formula:

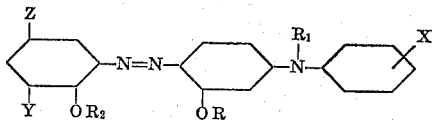

wherein R is selected from the group consisting of hydrogen, alkyl, and hydroxyalkyl; $R_1$ is selected from the group consisting of hydrogen, alkyl, hydroxyalkyl and cyanoalkyl; $R_2$ is selected from the group consisting of hydrogen and alkyl; X is selected from the group consisting of hydrogen, alkyl, alkoxy and chlorine; and Y and Z are selected from the group consisting of hydrogen, chlorine, nitro, alkyl, sulfonamido and haloalkyl, said alkyl, hydroxyalkyl, cyanoalkyl, alkoxy and haloalkyl radicals containing from 1 to 4 carbon atoms.

2. As a composition of matter, a complex metal compound according to claim 1 wherein the metal is cobalt.

3. As a composition of matter, a complex metal compound according to claim 1 wherein the metal is iron.

4. As a composition of matter, a complex metal compound according to claim 1 wherein the metal is manganese.

5. As a composition of matter, a complex metal compound according to claim 1 wherein the metal is chromium.

6. As a composition of matter, a complex metal compound according to claim 1 wherein the metal is nickel.

7. As a composition of matter, a complex nickel compound of

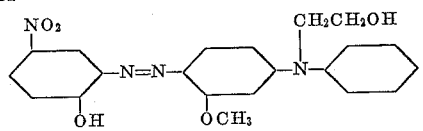

8. As a composition of matter, a complex nickel compound of

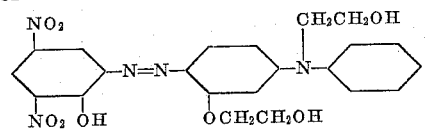

9. As a composition of matter, a complex nickel compound of

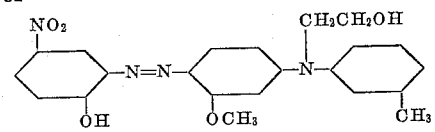

10. As a composition of matter, a complex nickel compound of

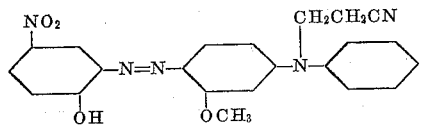

11. As a composition of matter, a complex nickel compound of

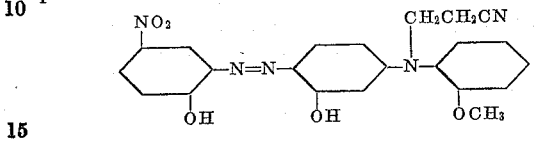

References Cited in the file of this patent

UNITED STATES PATENTS

| | | |
|---|---|---|
| 2,069,743 | Krzikalla et al. | Feb. 9, 1937 |
| 2,077,322 | Hatt | Apr. 13, 1937 |

UNITED STATES PATENT OFFICE

CERTIFICATE OF CORRECTION

Patent No. 2,843,580                                                       July 15, 1958

James M. Straley et al.

It is hereby certified that error appears in the printed specification of the above numbered patent requiring correction and that the said Letters Patent should read as corrected below.

Column 10, Table III, last column thereof, strike out the two references to "Brown".

Signed and sealed this 14th day of April 1959.

(SEAL)
Attest:

KARL H. AXLINE                                            ROBERT C. WATSON
Attesting Officer                                        Commissioner of Patents